June 13, 1944.     F. C. ZUCKER     2,351,386
ALIGNMENT GAUGE
Filed Dec. 23, 1942
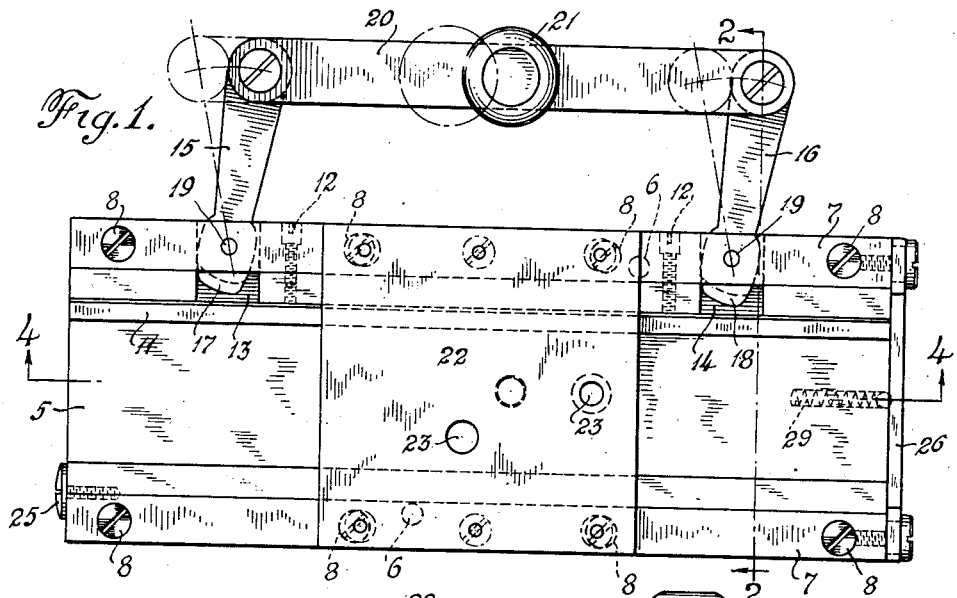
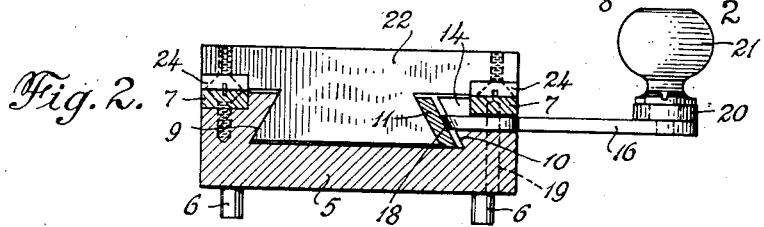
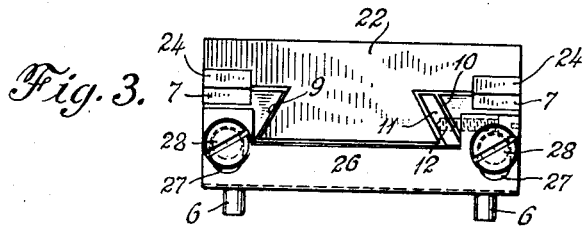
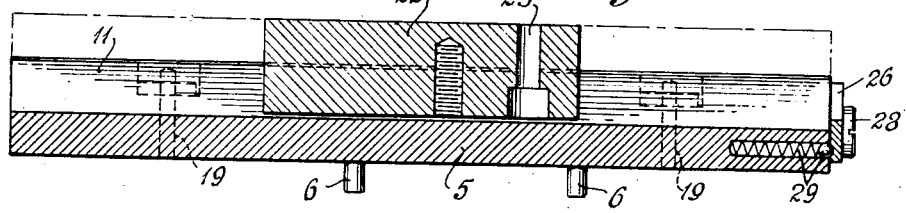
INVENTOR
FRANK C. ZUCKER
BY
ATTORNEYS Patented June 13, 1944

2,351,386

UNITED STATES PATENT OFFICE 2,351,386

ALIGNMENT GAUGE

Frank C. Zucker, New York, N. Y.

Application December 23, 1942, Serial No. 469,933

1 Claim. (Cl. 95—86)

The invention relates to photographic equipment, and more particularly, to an alignment gauge conventionally used in conjunction with a camera having separate focusing and photographing lenses. Such an alignment gauge is utilized, for instance, to accurately align close objects through a prismatic focusing magnifier. The camera, after being focused on a particular object, must be shifted from the focusing to the photographing position. This is accomplished by means of the alignment gauge.

An object of the present invention is to provide an alignment gauge by means of which the sliding platform thereof, upon which the camera is mounted and to which it is secured, may be rigidly fastened in any position along the length of the alignment gauge bed plate. The rigid fastening of the sliding platform is necessary once the proper centering of the object to be photographed and the accurate focusing thereof have been secured.

A more particular object of the invention is to provide means for rigidly fastening the sliding platform upon the gauge bed plate by means of a double acting cam-controlled lever mechanism, which will lock the dove-tailed edge of the sliding platform against the corresponding dove-tailed interior sliding surface of the gauge bed plate substantially throughout the contacting dove-tailed surfaces and thereby secure a rigid fastening of the sliding platform at any position thereof along the gauge bed plate.

A further feature of my invention is the provision of a spring-controlled stop bar at the end of the alignment gauge bed plate at which the sliding platform is inserted into the instrument so as to have a dove-tailed juncture with the correspondingly configured sliding surfaces of the gauge bed plate.

A particular embodiment of my novel alignment gauge is illustrated in the accompanying drawing, in which Fig. 1 is a plan view of the alignment gauge;

Fig. 2 is a section along the line 2—2 of Fig. 1;

Fig. 3 is an end view of the alignment gauge; and

Fig. 4 is a section along the line 4—4 of Fig. 1.

Referring more particularly to the drawing, in which similar reference characters identify similar parts in the several views, the instrument comprises a bed plate 5 having lugs 6 extending from the bottom face thereof by means of which the bed plate may be secured in position upon a tripod head or like instrument support. The upper longitudinal edge surfaces of the bed plate are provided with two separate horizontal runners 7 secured to the bed plate by screws 8. The bed plate is formed with interiorly extending dove-tail sliding surfaces 9 and 10, the latter having in substantial juxtaposition therewith a bar 11 running substantially throughout the length of the bed plate, and secured thereto by screws 12.

The portion of the bed plate on the side of the sliding surface 10 is recessed as at 13 and 14, the recesses extending from the bar 11 to the exterior longitudinal surface of the bed plate. Positioned for pivotal movement within the recesses 13 and 14 are two cam levers 15 and 16, respectively, the ends of which are provided with angularly disposed cam surfaces 17 and 18, which are adapted to ride against the adjoining face of the bar 11. The cam levers 15 and 16 are pivoted about pins 19 extending through the overlying runner 7 and the underlying portion of the bed plate 5. The ends of the two cam levers 15 and 16 are connected by a cross bar 20, there being at the center of the cross bar, a knob 21 by means of which the cross bar 20 may be moved lengthwise of the alignment gauge to cause the pivoting of the cam levers 15 and 16 and the engagement by the cam surfaces thereof of the bar 11. Upon movement of such cam levers, the cam surfaces at the ends thereof will cause movement of the bar 11 inwardly towards the center of the alignment gauge bed plate to press the bar against the dove-tailed sliding platform 22 and thereby lock such sliding platform rigidly at any point along the bed plate 5 to which it has been moved.

The sliding platform 22 is provided with apertures 23 by means of which the camera is secured to such sliding platform. The platform is also provided with a pair of runners 24 to facilitate sliding movement of the platform over the surfaces of the runners 7 of the bed plate.

At one end of the bed plate 5 is provided a stop screw 25 against the head of which the sliding platform 22 is adapted to abut at one end of its travel. At the opposite end of the bed plate a stop bar 26 is provided. Such stop bar, near its ends has a pair of elongated apertures 27 through which extend bolts 28, so that the stop bar may be moved from a slide clearing position to a slide barring position by movement thereof along the slots or apertures 27. In its uppermost position, the stop bar will prevent the sliding platform from sliding off the bed plate. The stop bar is resiliently held upon the bed plate also by the spring and ball structure 29.

In the operation of my device, when the camera is mounted upon the sliding platform of the alignment gauge and the camera has been focused on a particular object, the photographic lens is brought into proper position by shifting the entire camera on the alignment gauge from the focusing to the photographic position. This is accomplished by merely pushing the sliding platform, after release thereof by a sideward movement of the cross bar 20 to its unlocking position. After the sliding platform and camera have been brought to the desired position along the bed plate, it is only necessary for the operator to grasp the knob 21 and move it in the opposite direction, thereby pivoting the two cam levers and causing the cam surfaces thereof to press the bar 11 against the entire contiguous surface of the dove-tailed portion of the sliding platform. The camera will then be fixed rigidly at the point along the bed plate to which it has been moved by the movement of the sliding platform.

While I have described a particular embodiment of my invention, it is obvious that various changes in the particular construction and specific configuration of the several parts may be made without departing from invention.

I claim:

An alignment gauge for photographic equipment comprising a bed plate having a fixed angularly disposed sliding surface and a movable angularly disposed slide bar, a sliding platform having a dove-tailed extension corresponding in angularity to the sliding surfaces of the bed plate, and a double acting locking mechanism for locking said movable slide bar against the dove-tailed surface of the sliding platform, said double acting locking mechanism comprising a pair of cam levers, having cam surfaces in contact with said movable slide bar, and a cross-bar connecting the opposite ends of the cam levers, whereby movement of said cross-bar in either direction lengthwise thereof causes a corresponding movement of said cam levers and the abutment of their cam surfaces against the movable slide bar to lock said bar against the sliding platform, including a stop bar at one end of the bed plate adapted to be moved from a position in which the raceway of the bed plate is uncovered, permitting removal of the sliding platform from said bed plate, to a position in which said stop bar constitutes an abutment for the sliding platform.

FRANK C. ZUCKER.